United States Patent [19]

Healey et al.

[11] Patent Number: 5,013,140

[45] Date of Patent: May 7, 1991

[54] OPTICAL SPACE SWITCH

[75] Inventors: Peter Healey; Stephen R. Mallinson, both of Ipswich, England

[73] Assignee: British Telecommunications public limited company, London, England

[21] Appl. No.: 348,576

[22] PCT Filed: Sep. 9, 1988

[86] PCT No.: PCT/GB88/00745

§ 371 Date: Apr. 27, 1989

§ 102(e) Date: Apr. 27, 1989

[87] PCT Pub. No.: WO89/02614

PCT Pub. Date: Mar. 23, 1989

[30] Foreign Application Priority Data

Sep. 11, 1987 [GB] United Kingdom ............... 8721472
Feb. 23, 1988 [GB] United Kingdom ............... 8804202

[51] Int. Cl.$^5$ ............................ G02F 1/13; G02B 5/30
[52] U.S. Cl. ............................... 350/347 E; 350/335; 350/352; 350/400; 350/401
[58] Field of Search ............... 350/347 E, 347 R, 352, 350/335, 400, 401, 96.13, 377, 378

[56] References Cited

U.S. PATENT DOCUMENTS

| 2,009,956 | 6/1979 | Thomson. | |
|---|---|---|---|
| 3,435,447 | 3/1969 | Duda et al. | 340/347 |
| 3,501,640 | 3/1970 | Harris | 250/199 |
| 3,540,795 | 11/1970 | Harris | 350/157 |
| 3,719,414 | 3/1973 | Wentz | 350/150 |
| 4,129,357 | 12/1978 | Frosch | 350/157 |
| 4,236,783 | 12/1980 | Hepner et al. | 350/96.13 |
| 4,410,238 | 10/1983 | Hanson | 350/347 E |
| 4,461,543 | 7/1984 | McMahon | 350/383 |
| 4,575,193 | 3/1986 | Greivenkamp Jr. | 350/401 |
| 4,626,897 | 12/1986 | Sato et al. | 350/401 X |

FOREIGN PATENT DOCUMENTS

| 0151612 | 7/1986 | Japan | 350/352 |
| 8809951 | 12/1988 | World Int. Prop. O. | 350/400 |

OTHER PUBLICATIONS

E. G. Hanson, "Polarization Independent Liquid Crystal Attenuator for Fiber Optics Application", Applied Optics, vol. 21, No. 7, Apr. 1982 pp. 1342-1344.

Berezin et al.; "Liquid Crystal Deflector", Sov. J. Quant Electron, vol. 4, No. 5, pp. 693-694; Nov. 1974.

Soref and McMahon, "Calcite 2×2 Optical Bypass Switch Controlled by Liquid-Crystal Cells," *Optics Letters*, vol. 7, No. 4 (Apr. 1982), pp. 186-188.

Schmidt, "A High Speed Digital Light Beam Deflector," *Physics Letters*, vol. 12, No. 3 (1 Oct. 1964), pp. 205-206.

Schmidt, "Electro-Optic Deflection of a Laser Beam," *Philips Tech. Review*, vol. 36, No. 5 (1976), pp. 117-132.

Nelson, "Digital Light Deflection," *The Bell System Technical Journal*, vol. XLIII, No. 3, (May 1964), pp. 821-845.

Optics Letters, vol. 6, No. 6, Jun. 1981, Optical Soc. of America (New York, U.S.) R. A. Soref: "Low-Cross-Talk 2×2 Optical Switch", pp. 275-277.

Primary Examiner—Stanley D. Miller
Assistant Examiner—Huy K. Mai

[57] ABSTRACT

An optical space switch comprising an optical output; three optical deflection stages each having a twisted-nematic liquid crystal polarization rotator responsive to a respective bi-state control signal and a calcite crystal deflection means for selectively deflecting optical signals according to their polarization. The deflection stages are arranged serially to define eight distinct source locations from where an optical signal is selectively deflectable successively by the deflection stages to the optical output. A distinct combination of states of the three control signals corresponds to each location. Each input is formed from an array of fibers so as to be capable of launching an optical signal which is spatially modulated transverse to the signal propagation direction. Each deflection stage preserves the spatial integrity of the deflected optical signals.

15 Claims, 3 Drawing Sheets

OTHER PUBLICATIONS

Applied Optics, vol. 21, No. 8, 15 Apr. 1982, (New York, U.S.) R. A. Soref: "Electrooptic 4×4 Matrix Switch for Multimode Fiber-Optic Systems", pp. 1386-1393.

IBM Journal 1964, "A Fast Digital Indexed Light Deflector".

IEEE Transactions on Computers, vol. C-27, No. 12, Dec. 1978—"Generalised Connection Networks for Parallel Processor Intercommunication".

Bell System Technical Journal, vol. XLIII, No. 3, May 1964-"Digital Light Deflection".

IBM Technical Disclosure Bulletin, vol. 6, No. 10, Mar. 1964—"Optical Read and Write Devices using Electrooptical Logic".

Stork, "Optical Crossbar," Optik, 76, No. 4, Jul. 1987—pp. 173-175.

OPTICAL SPACE SWITCH

This invention relates to an optical space switch.

R. A. Spanke in a paper entitled Architectures for Large Nonblocking Optical Space Switches, IEEE Journal of Quantum Electronics Vol. QE-22, No.6, June 1986, discusses the use of active, N to 1 combiners fabricated from optical space switch elements on Ti:-LINbO3 for use in nonblocking N to N optical space switch architectures. Such known N to 1 space switches are capable of selectively switching a selected one of N optical signals to an output.

According to the present invention an optical switch comprises— an optical output;

n optical deflection stages each comprising a polarization rotator responsive to a respective control signal to rotate the polarization of an optical signal through 90°, and a deflection means for selectively deflecting optical signals according to their polarization;

the n deflection stages being serially arranged to define $2^n$ distinct source locations from where an optical signal is selectively deflectable successively by the n deflection stages to the optical output, a distinct combination of states of the n control signals corresponding to each location;

a plurality of up to $2^n$ optical sources each located at one of the $2^n$ source locations;

and in which each deflection stage preserves the spatial integrity of the deflected optical signals.

An advantage of the present invention over known optical switches capable of connecting one of N inputs to an output is that it can switch optical signals having up to two spatial dimensions. For example, each optical signal might be a complete databus or represent a page of computer memory so providing a means of optically switching information at a greatly increased rate.

All the optical signals which enter a given one of the deflection stages pass through the same polarization rotator which therefore operates on spatially multiplexed signal paths giving a significant reduction in the effective number of cross-points and which uses few optical and electro-optical subassemblies.

By spatial integrity is meant that although an input signal may be distorted spatially as it is switched to the output, for example expanded or contracted, there is a consistant mapping between the spatial elements of the switched input and output signals which preserves the information content of the spatial modulation.

In this specification, the term "optical" is intended to refer to that part of the electromagnetic spectrum which is generally known as the visible region together with those parts of the infra-red and ultra-violet regions at each end of the visible region capable of having the polarization rotated.

The deflection means may be an optical component which supports propagation of the optical signal in two directions dependant on the polarization of the signal, for example a bi-refringent crystal such as calcite, or one which selectively reflects light of a given polarization, such as a polarizing beam splitter. In this case a prism may be conveniently used to align incoming signals with the beamsplitter such that all selected signals from the deflection stage pass from the beamsplitter in the direction of the next deflection stage or the output.

Embodiments of the invention will now be described by way of example only by reference to the accompanying drawings on which FIG. 1 is a schematic perspective view of an optical switch according to the present invention using a birefringent crystal deflection means;

Figure 1:
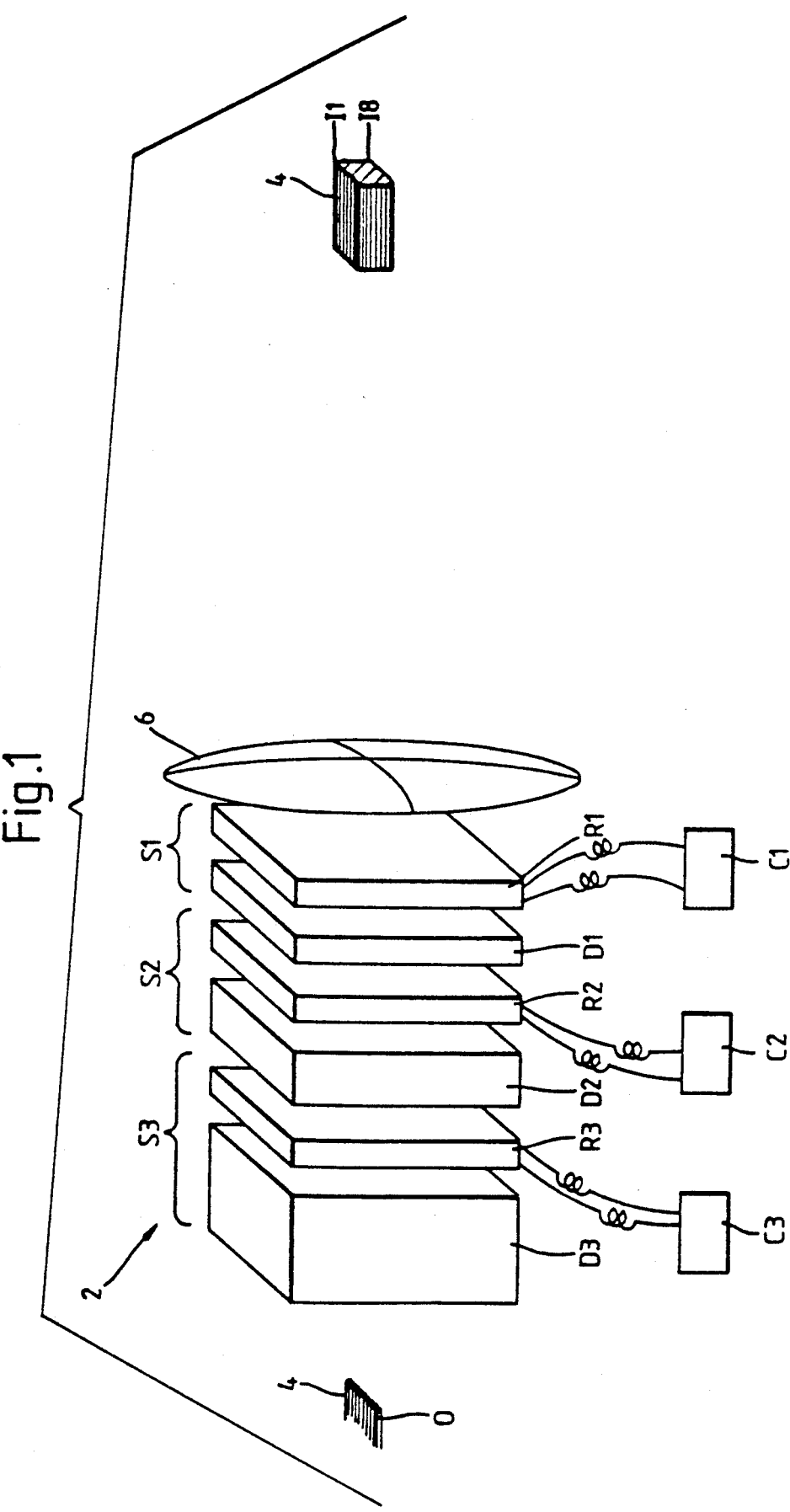

Referring to FIG. 1, an 8-to-1 optical switch 2 is shown which can optically switch a selected one of inputs I1 to I8 to an output O. Each of the inputs I and the output O are in the form of a linear array of eight optical fibers 4 connectable to an optical network (not shown) the input fibers being of 1.3 μm monomode fiber, the output fibers multimode. At any given time the optical signals launched from the inputs I may be spatially modulated according to the signal emitted by the individual fibers 4 of that input I which could be representative of the instantaneous state of an eight-bit computer bus, for example. The fibers 4 of the output O receive light from the corresponding fibers of an input I. In this way one of eight, eight-bit optical buses can be switched to the output O for passing to the network (not shown) for processing. It will be readily appreciated that the present invention is not restricted to this example of spatially modulated signal nor this particular application but is equally applicable to other means of forming the spatially modulated signals and to other optical networks requiring such optical signals to be switched to an output.

The optical switch of FIG. 1 has three deflection stages S1 to S3 each having a twisted-nematic liquid crystal cell polarization rotator R and a birefringent calcite block deflector D, labled R1 to R3 and D1 to D3 respectively. The calcite blocks D1 to D3 have approximately 1 cm square faces with thicknesses of 1.22 mm, 2.44 mm and 4.88 mm respectively with the optical axis of the blocks D at an angle of 48° to the front face. Electronic drives controllers C1, C2 and C3 each provide a voltage to cause the polarization rotators R to allow light to pass through with the polarisation unrotated or rotated through 90° as required. The rotators at each deflection stage can therefore be set to rotate or not the linear polarization of the light entering the stage.

The inputs I are arranged to launch light polarized linearly in the direction of an ordinary ray propagating in the calcite deflectors D.

A lens 6 is interposed between the inputs I and output O of a focal length such that the effective optical path length from the lens to the inputs I and output O is equal to twice the focal length of the lens. This provides 1:1 imaging magnification between the inputs I and the output O. In the embodiment of FIG. 1 the lens has a focal length of 20 mm.

In the case of a twisted nematic liquid crystal a control signal of O Volts causes a 90° rotation, whereas a non-zero control signal applied across the liquid crystal cell destroys the twisted structure removing the polarization-rotation property.

As will be explained in more detail, this optical switch provides eight possible deflections of the input optical in increments of 125 μm, the number of increments determining which of the inputs I is deflected to fall on the output O.

The operation of the optical switch 2 of FIG. 1 will now be explained with reference to FIG. 2 which shows the side view of the switch 2.

Each deflector stage S1, S2 and S3 operates as the digital light deflector described by W. Kulcke, T. J. Harris, K. Kosanke and E. Max in a paper entitled "A Fast, Digital-Indexed Light Deflector" IBM Journal January 1964. If the optical signal entering a calcite crystal is linearly polarized in the horizontal direction it will pass straight through the crystal as the ordinary ray, if polarized in the vertical direction it will be deflected as if propagates as the extraordinary ray to exit the crystal D displaced relative to an ordinary ray but parallel to it. The displacement between the ordinary and extraordinary rays is directly proportional to the thickness of the deflector crystal. Thus by employing stages with thicknesses in the ratio 1:2:4, 8 possible increments of displacement are possible. A set of examplary rays $10_1$ to $10_8$ one from each of the inputs I, and all arranged to be horizontally polarised is shown. If all the rotators R are set to leave the polarization of light unaltered on passing through it, each ray 10 will remain horizontally polarized and pass through the optical switch 2 undeflected.

The located output is located relative to the inputs such that the optical signal from the optical fibers 4 of input I1 of FIG. 1 will be coupled to the output fibers 4 of the output O. If the rays entering D1, D2 or D3 are vertically polarized they will be deflected 1, 2 or 4 125 μm units by the stages D1 to D3 respectively.

Consider now rotators R1, R2 and R3 all set to rotate the polarization of the optical signal through 90° by the application of the appropriate control signals from the controllers C1, C2 and C3. The horizontally polarised signals from the inputs I are rotated by rotator R1 to have vertical polarization and consequently they are all deflected by unit of 125 μm away from the undeflected line 11 shown as a dotted lines for ray $10_1$ and $10_8$. Rotator R2 rotates the polarizations back to the horizontal polarization so all the signals pass undeflected through the second stage S2. Rotator R3 again rotates the polarization, this time from horizontal to vertical so the deflector D3 causes a four-unit deflection of all the rays. The net, five unit deflection means the rays from input 6 fall on the fibers 4 of output O of FIG. 1. The other eight possible settings of the bi-state controllers C1, C2 and C3 will each selectively cause a respective distinct input I to be connected to the output O.

The different thickness deflectors D can be arranged in any order. Further deflection stages can be provided to provide a larger number of switchable inputs as desired there being $2^n$ switchable inputs for an n-stage optical switch. For these larger inputs it may be convenient to locate the rotators at the focal point of a pair of convex lenses of equal focal length to reduce the area of rotator needed to rotate or not the optical signals passing through the stage.

Figure 2:
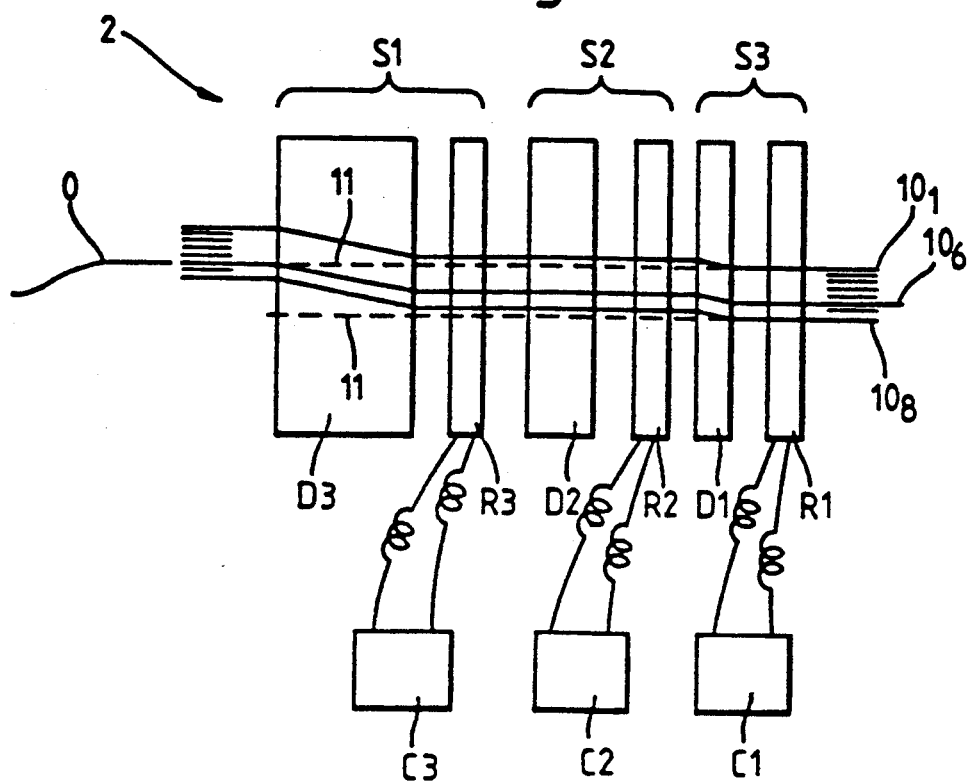
FIG. 2 is a schematic side view of the optical switch of FIG. 1 illustrating its use with collimated optical signals.
Figure 3:
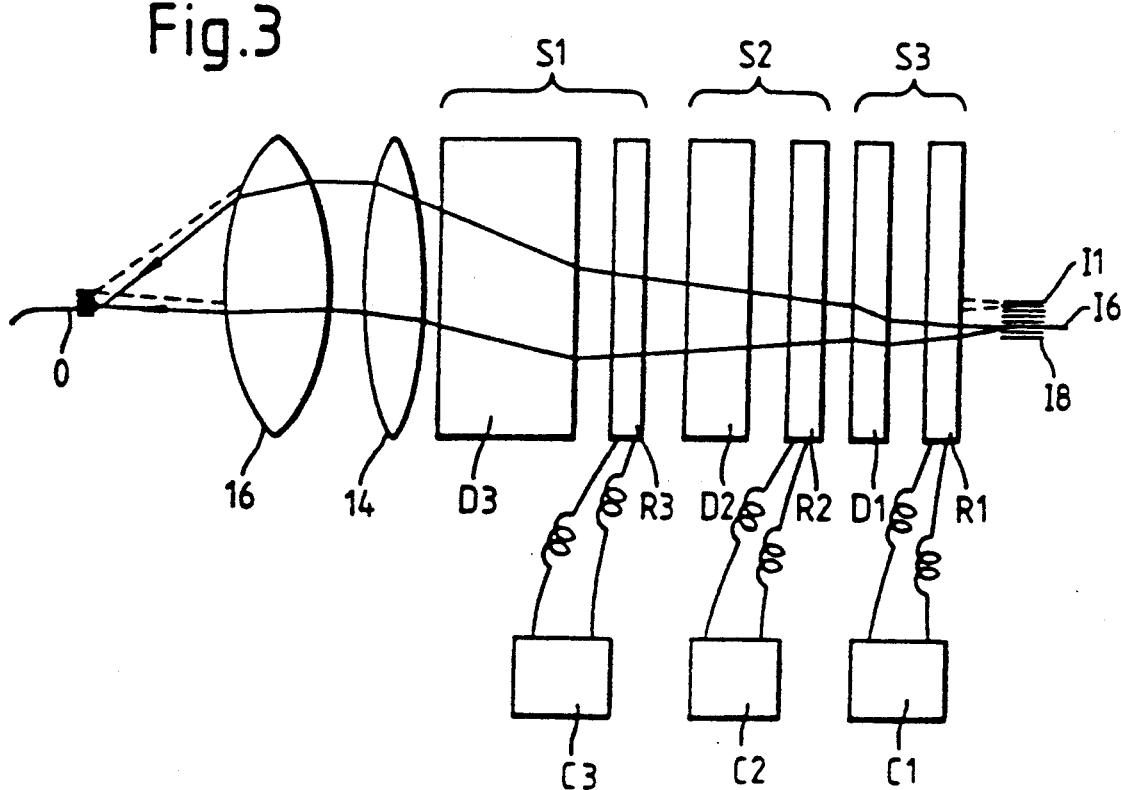
FIG. 3 is a schematic end view of the optical switch of FIG. 1 but using divergent optical sources and having additional lenses to focus the sources onto the output.

Referring now to FIG. 3 there is illustrated how the three deflection stages S of FIG. 2 operate with divergant beams of which only that from $I_6$ is shown in clarity. Only optical signals from input $I_6$ would be directed by lenses 14 and 16 to be focussed on the output O, the other inputs being focussed to a position displaced from the output O, when all three rotators 12 are activated. The other inputs I can be selectively switched to the output by activating other combinations of rotators R to provide different total deflections as described for non-divergent beams with reference to FIG. 2. The use of divergent beams as shown in FIG. 3 is particularly attractive for fiber optic circuits.

Figure 4:
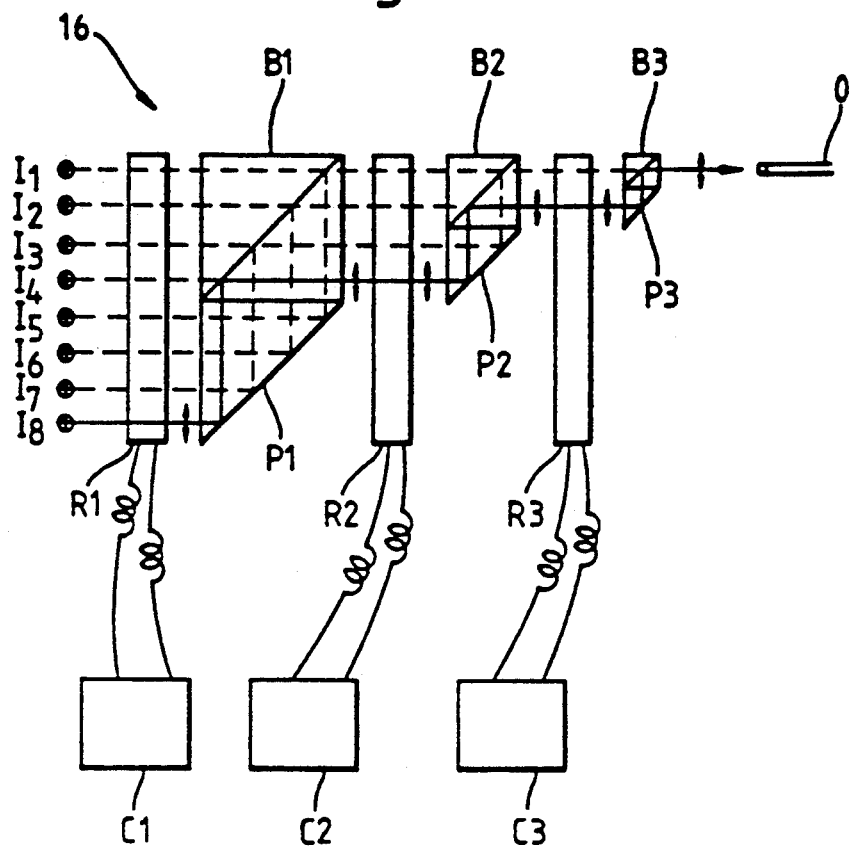
FIG. 4 is a schematic end view of an optical switch using polarization beamsplitters and prisms as the deflection means.

Referring now to FIG. 4, there is shown the three deflection stages of an optical switch 16 in which the deflection means are formed from a polarization beamsplitters B1 to B3 and prisms P1 to P3 to define eight distinct locations which can be directed the output O. At each stage half the ray paths enter a beamsplitter B in one direction, the other half at right angles to that direction via the corresponding prism P. All the optical signals have the same polarization on entering a stage. If vertically polarized the half entering the beamsplitter B from the prism P will be deflected to the next stage, the remainder being deflected away. If the optical signals are horizontally polarized those entering the beamsplitter B from the prism P will pass undeflected out of the switch, the remaining half passing through undeflected to the next stage. This arrangement can therefore select which of the eight inputs I is to be output to the output O by setting the polarization rotators R accordingly to determine which half of the optical signals entering a given stage will be passed to the next stage and, eventually, the output O.

Electro-optic switches other than twisted-nematic liquid crystals can be used as polarization rotators, for example PLZT or iron garnets in all the above embodiments.

Figure 5:
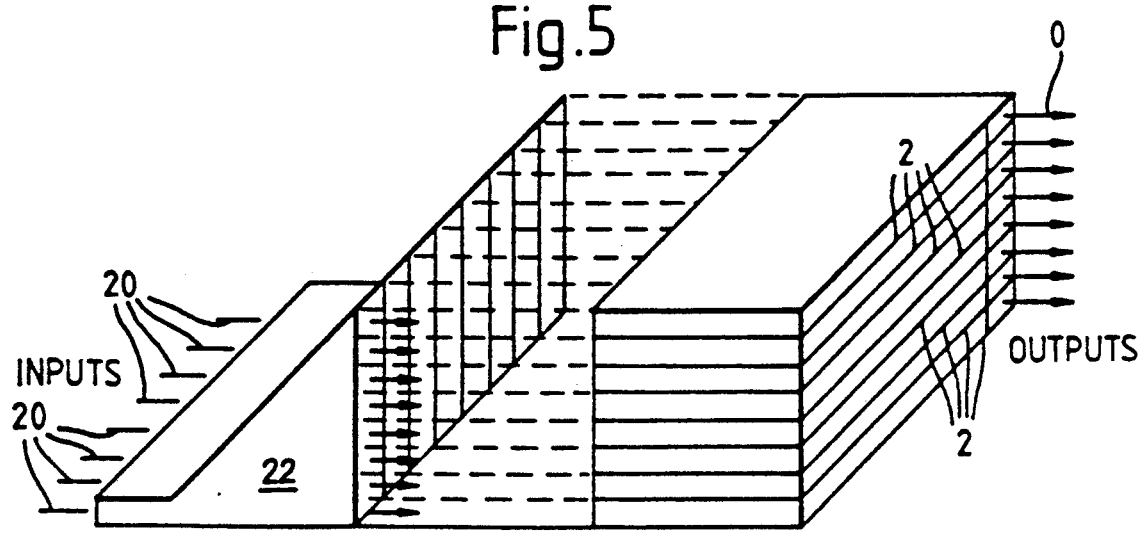
FIG. 5 is a diagramatic, perspective view of a generalized connection network formed from the N-fold array of optical switches of FIG. 4 having optical sources generated by an N signal distributor.

Referring now to FIG. 5 there is shown a generalized optical connection network having eight inputs 20 formed by cascading a passive optical signal distributor 22 as described in the applicant's co-pending application GB No. 8721472 with eight optical space switches 2 according to the present invention arranged in parallel. The signal distributor 22 creates eight equal intensity but spatially separated copies of each of the spatially modulated inputs 20 which copies provide spatially modulated inputs to each optical space switch 2. Each optical space switch 2 therefore has eight inputs, each being a copy of a different one of the eight spatially modulated inputs 20. As each optical space switch 2 can select one of the eight copies to be the corresponding output, the combination acts as an eight way N×N space switch having $8^8$ setting. The total number of control signals and crosspoints in such a generalized optical connection network is the theoretical minimum of only N log$_2$N. The minimum loss however is 10 log$_{10}$N(dB) due to the passive input signal distributors.

A generalized permutation network could alternatively be formed by replacing the optical distributor with parallel optical space distributors of the type discussed in the above referenced paper by Kulke et al. Again, these can be extended to have N from 1 to a number greater than 8 to provide larger N, N×N optical connections. The distributor loss and 1st order crosstalk are eliminated but it will have only N! settings and requires twice as many control signals and cross-points as the generalised optical switch. These could be made asynchronously self-routing since the control code line could be set optically.

We claim

1. An optical space switch comprising:
   an optical output;
   n optical deflection stages each comprising a polarization rotator responsive to a respective control signal to rotate the polarization of an optical signal through 90°, and a deflection means for selectively deflecting optical signals according to their polarization;
   said n deflection stages being serially arranged to define $2^n$ distinct source locations from where any single optical signal is selectively deflectable successively by the n deflection stages to said optical output, a distinct combination of states of the n control signals corresponding to each location;
   a plurality of up to $2^n$ optical sources each located at one of said $2^n$ source locations;
   and in which each deflection stage preserves the spatial integrity of the deflected optical signals.

2. A switch as claimed in claim 1 in which the optical sources emit an optical signal whose spatial modulation is representative of at least one binary word.

3. An optical space switch comprising:
   an optical output;
   n optical deflection stages each comprising a polarization rotator responsive to a respective control signal to rotate the polarization of an optical signal through 90°, and a deflection means for selectively deflecting optical signals according to their polarization;
   said n deflection stages being serially arranged to define $2^n$ distinct source locations from where any single optical signal is selectively deflectable successively by the n deflection stages to said optical output, a distinct combination of states of the n control signals corresponding to each location;
   a plurality of up to $2^n$ optical sources each located at one of said $2^n$ source locations, said optical sources each comprising a plurality of optical fibers;
   and in which each deflection stage preserves the spatial integrity of the deflected optical signals.

4. An optical space switch comprising:
   an optical output;
   n optical deflection stages each comprising a polarization rotator responsive to a respective control signal to rotate the polarization of an optical signal through 90°, and a deflection means for selectively deflecting optical signals according to their polarization;
   said n deflection stages being serially arranged to define $2^n$ distinct source locations from where any single optical signal is selectively deflectable successively by the n deflection stages to said optical output, a distinct combination of states of the n control signals corresponding to each location;
   a plurality of up to $2^n$ optical sources each located at one of said $2^n$ emitter locations, said optical sources each comprising a plurality of individually modulated optical emitters;
   and in which each deflection stage preserves the spatial integrity of the deflected optical signals.

5. A switch as claimed in either claims 1, 3 or 4 in which said deflection means comprises a birefringent material.

6. A switch as claimed in claim 5 in which said birefringent material is calcite.

7. A switch as claimed in either claims 1, 3 or 4 in which said deflection means comprises a combination of polarization beamsplitters and prisms.

8. A switch as claimed in either claims 1, 3 or 4 in which said polarization rotator is a twisted-nematic liquid crystal.

9. A switch as claimed in either claims 1, 3 or 4 in which the optical signals are collimated.

10. A switch as claimed in either claims 1, 3 or 4 in which said optical sources provide divergent optical signals and further comprising a means for directing the optical signal which emerges axially from the final deflection stage to said output.

11. A switch as claimed in either claims 1, 3 or 4 in which each said optical source is capable of launching an optical signal which is spatially modulated transverse to the signal propagation direction.

12. An optical space switch comprising:
    n optical deflection stages serially arranged, each comprising a polarization rotor and a deflector for selectively deflecting optical signals according to their polarization;
    said polarization rotor alters the polarization of an optical signal in response to a control signal;
    said n deflection stages define $2^n$ distinct source locations, an optical signal from any of said locations is selectively deflectable to an optical output by said deflection stages, a unique combination of states of said control signals corresponding to each location, and
    up to $2^n$ optical sources each located at one of said source locations.

13. An optical connection network comprising:
    n passive optical signal distributors, each distributor receiving an optical input signal and emitting m duplicate signals copied from said optical input signal;
    m optical space switches wherein each switch receives at said source locations one of said m duplicate signals from each distributor, and said optical signals being the emitted signals from the distributor, each optical space switch comprising:
    an optical output;
    n optical deflection stages each comprising a polarization rotator responsive to a respective control signal to rotate the polarization of an optical signal through 90°, and a deflection means for selectively deflecting optical signals according to their polarization;
    said n deflection stages being serially arranged to define $2^n$ distinct source locations from where any single optical signal is selectively deflectable successively by the n deflection stages to said optical output, a distinct combination of states of the n control signals corresponding to each location;
    a plurality of up to $2^n$ optical sources each located at one of said $2^n$ source locations;
    and in which each deflection stage preserves the spatial integrity of the deflected optical signals.

14. A method of optically switching an array of up to n optical signals using n passive optical signal distributors and m optical space switches, each switch having an output, n deflection stages and $2^n$ source locations for receiving signals from the distributors and each deflection stage comprising a polarization rotator responsive to a respective control signal and a deflector, said method comprising the steps of:
    (a) inputting up to n optical signals into the distributors;
    (b) distributing these signals such that m copies of each signal is emitted by a distributor and a copy signal is received by each of the optical switches, and each switch receiving up to n signals from n distributors;

(c) setting the control signals for the rotators such that a selected one of the up to n signals received by each switch is rotated and deflected to the output of each switch.

15. A method of optically switching one of up to n optical input signals to an output using an optical space switch having n deflection stages in which each stage has $2^n$ distinct source locations and includes a polarization rotator responsive to a respective control signal and a deflector that selectively deflects an optical signal according to its polarization, said method comprising the steps of:

(a) inputting up to $2^n$ optical signals into the switch such that each signal enters a unique source location, (b) setting the control signals for the rotators such that the control signals correspond to a preselected one of the source locations, and (c) adjusting the path of the optical signal entering the preselected source location by rotating the polarization of the signal and deflecting the optical signal in the deflection stages so that only the preselected signal reaches the output of the switch.

* * * * *